United States Patent [19]

Lukas et al.

[11] 4,258,977

[45] Mar. 31, 1981

[54] OPTICAL FIBRE CONNECTOR

[75] Inventors: Helmut H. Lukas, Carleton Place; Jaroslav M. Hvezda; Jack F. Dalgleish, both of Ottawa, all of Canada

[73] Assignee: Northern Telecom Limited, Montreal, Canada

[21] Appl. No.: 926,834

[22] Filed: Jul. 21, 1978

[30] Foreign Application Priority Data

Jun. 5, 1978 [CA] Canada .................................. 304727

[51] Int. Cl.³ .............................................. G02B 5/14
[52] U.S. Cl. .................. 350/96.21; 264/1.1; 350/320
[58] Field of Search ............ 350/96.15, 96.20, 96.21, 350/96.22, 320; 264/1

[56] References Cited

U.S. PATENT DOCUMENTS

| | | | |
|---|---|---|---|
| 3,972,585 | 8/1976 | Dalgleish et al. | 350/96.21 |
| 3,999,841 | 12/1976 | Dakss et al. | 350/320 |
| 4,008,948 | 2/1977 | Dalgleish et al. | 350/96.21 |
| 4,077,702 | 3/1978 | Kunze et al. | 350/96.21 |
| 4,088,390 | 5/1978 | McCartney | 350/96.21 |
| 4,114,979 | 9/1978 | Heldt | 350/96.21 |
| 4,133,601 | 1/1979 | Le Guen et al. | 350/96.21 |
| 4,181,400 | 1/1980 | Malsot et al. | 350/96.21 |

FOREIGN PATENT DOCUMENTS

2759115 7/1978 Fed. Rep. of Germany ........ 350/96.21

*Primary Examiner*—Stewart J. Levy
*Assistant Examiner*—John D. Lee
*Attorney, Agent, or Firm*—Sidney T. Jelly

[57] ABSTRACT

An optical fibre connector for connecting one or more pairs of single fibres in end-to-end relationship has an alignment member having two opposed and inclined datum surfaces, generally in the form of a Vee, and two tubular ferrules resting on the datum surfaces. The ferrules each have two datum positions extending along the ferrule and spaced circumferentially to cooperate with the datum surfaces. Each ferrule has a fibre receiving bore which is formed at a predetermined positional relationship to the datum positions. Rotational location is provided between ferrules and alignment member. The bore is formed by casting material in the ferrule using a mandrel, the ferrule and mandrel accurately positioned in an alignment tool which reproduces the datum surfaces of the alignment member. Build up of tolerances is avoided and slight variation in diameters of the ferrules, and lack of concentricity can be accommodated with accurate alignment of fibre ends still obtained. The invention can be used for a permanent connection, that is a splice, or for make, break and remake types of single or multiple connectors.

36 Claims, 28 Drawing Figures

OPTICAL FIBRE CONNECTOR

This invention relates to a connector, for connecting ends of pairs of single optical fibres in end-to-end relationship with minimal loss due to lack of alignment, with the end of each fibre protected both before and during making the connection.

In fibre optics systems, it is necessary to connect a pair of fibres in accurate end-to-end alignment to give minimal loss of signal strength. At the same time it is often necessary to be able to break and remake such a connection, in many cases a large number of times while retaining accurate alignment.

Various ways of obtaining alignment have been proposed. For laboratory purposes it is possible to use micromanipulators to give accurate alignment but such methods are not suitable for field application, for example in telecommunication systems. One form of devices aligns two fibres by locating directly on the fibre cladding, usually with any protective coating removed. However, the ends of the fibres are not protected before making the connection. One such form uses a Vee grooved member, and while this is convenient and effective for splices, where the fibre ends are permanently connected once positioned in the Vee groove, the arrangement is not so effective for connections which need to be made and remade. A Vee groove will not give good alignment if the diameters of the two fibres are different.

Another form as described in U.S. Pat. No. 3,972,585 issued Aug. 3, 1976, uses a deformed sleeve or tube, the sleeve deformed to provide a plurality of inwardly deformed portions with a central bore a close fit on an uncoated fibre, and an inclined surface at each end of the deformed portions. The fibre ends are inserted from each end of the sleeve or tube with the opposed ends abutting, or in close proximity, in the central bore. This form of connector, which can also be used as a splice, has certain disadvantages. It is possible that the end surface of the fibres will entrap small pieces of material in the bore as the fibres are inserted and such pieces will interfere with light transmission across the connection. Also both fibres must be the same diameter for good alignment.

An alternative form of device in the unmated condition, provides a protective sleeve or housing around the fibre, and achieves alignment by locating on the outer surface of the sleeves. Each fibre is first positioned in a sleeve and then the sleeves are positioned in a tubular member. There is a severe disadvantage in this form of connector in that tolerances in manufacture can build up through the connector to give very poor alignment. Such tolerances are: the bore in the sleeves and concentricity of the bore; the outside diameter of the sleeves; the bore of the tube.

In its broadest aspect the invention provides a connector for connecting a pair of single fibres in accurately aligned end-to-end relationship, comprising a tubular ferrule for each fibre end and an alignment member for reception of the ferrules end-to-end, each ferrule having a material cast therein to define a bore for the fibre, the alignment member including datum surfaces inclined in a Vee formation, the ferrules each having a datum position for cooperation with the datum surfaces on the alignment member, said bores having a predetermined position relative to said datum positions. The preparation of the bores relative to the datum positions is made in an alignment tool having surfaces reproducing the datum surfaces on the alignment member. The alignment member includes means for resiliently urging the ferrules into contact with the datum surfaces on the alignment member.

The connector can be used singly, or in multiples for connecting a multiplicity of pairs of fibres, with the connections being made, broken and remade. The connector can also be used to permanently connect two fibres, normally called splicing.

Thus the present invention provides a connector in which the fibre ends are each inserted into a ferrule or protective sleeve, the ferrule having an oversize bore into which is cast a material, in an alignment tool, to give a bore for the fibre, the ferrules then assembled in an alignment member. The casting of the bore is done with the ferrule on datum surfaces in the alignment tool so that datum positions occur on the ferrules. The alignment tool reproduces the datum surfaces of the alignment member and small locating keys on the ferrules ensure that the ferrules always have their datum positions on the datum surfaces. By this means, manufacturing tolerances are substantially non effective and different diameter fibres can be accommodated.

Figure 1:
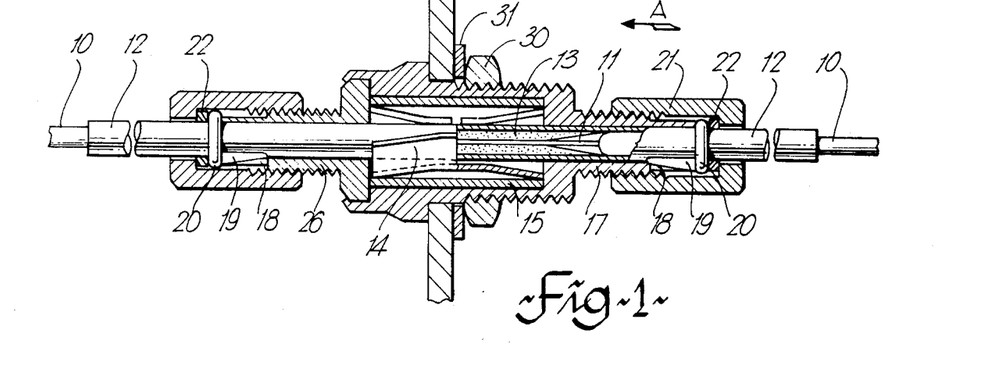
FIG. 1 is a longitudinal cross-section through one form of connector for a single pair of fibres.
Figures 2, 3, 4:
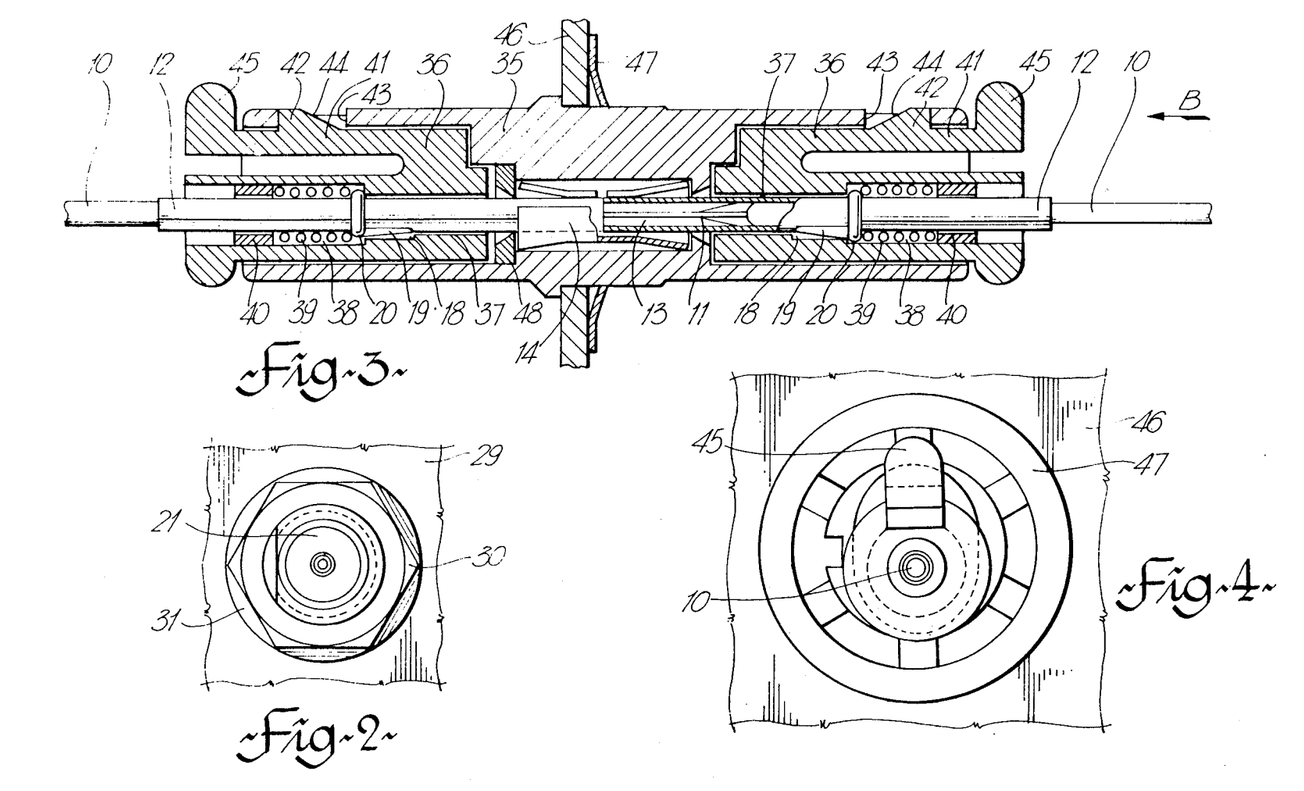
FIG. 2 is an end view in the direction of arrow A in FIG. 1.
FIG. 3 is a longitudinal cross-section through another form of connector for a single pair of fibres.
FIG. 4 is an end view in the direction of arrow B in FIG. 3.

The invention will be readily understood by the following description of various embodiments, by way of example, in conjunction with the accompanying drawings, in which:

FIGS. 1 and 3 illustrate, in longitudinal cross-section, two alternative forms of a connector for connecting a single pair of optical fibres in end-to-end relationship. In FIG. 1, the connector body is typically of metal and in FIG. 3 the connector body is molded, for example of a synthetic resin material.

The coated fibres are indicated at 10 and on the ends of the fibres, which are uncoated and indicated at 11, are attached ferrules 12. The ferrules comprise a tubular member in which is cast an annular positioning portion 13. The uncoated ends of the fibres are a close fit in the bores of the annular positioning portions 13. The ferrules are positioned, in end-to-end relationship, in an alignment member 14. The ferrules are retained on the fibres by any suitable means, an example being an adhesive.

In the arrangment of FIG. 1, the alignment member 14 is placed in a sleeve 15 which in turn is in a main body member 16. The sleeve 15 has a generally triangular bore, to accommodate the alignment member. The body member 16 has an axial extension 17 having a bore which is a fairly close fit on one of the ferrules 12. The extension 17 has a slot 18 at its end for reception of a key 19 on the ferrule, and a circumferential rib 20 on the ferrule abuts the end of the extension 17. A cap 21 screws on to the extension 17, with a spring washer 22 positioned between the inner end surface of the cap and the rib 20.

At the end of the main body member 16 remote from the extension 17 is attached a further member 25 having an axial extension 26. The extension 26 is similar to extension 17 and has a bore which is a fairly close fit on the other ferrule 12. The extension 26 has a similar slot 18 for key 19 on the ferrule and a rib 20 on the ferrule adjacent the end of the extension. A spring washer 22 is positioned between cap 21 and the rib 20. In this example, which is particularly applicable to a bulkhead connector, the member 25 fits into a recess 27 in the end of the main body member 16 and the wall of the recess is swaged over, at 28, to permanently attach the member 25 to member 16. However other ways of attaching member 25 to member 16 can be used. In FIG. 1, the bulkhead is indicated at 29 with a nut 30 on a threaded outer surface of the body member 16, and an intervening washer 31. However the connector of FIG. 1 can also be used as a straightforward connector. FIG. 2 is an end view of the connector of FIG. 1.

In FIG. 3 the alignment member 14 is positioned in a generally triangular bore in a main body member 35, retained in position by a washer 48 which is secured by adhesive. At opposite ends of the main body member are inserted plugs 36. Each plug has an axial bore having an inner portion 37 which is a fairly close fit on a ferrule and an outer portion 38 into which the circumferential rib 20 fits. Positioned outside the rib 20 is a compression spring 39 retained in the bore portion 38 by a retaining sleeve 40. Sleeves 40 are a press fit in the bore portion 38 and can also be retained by adhesive. The outer ends of the bore portions 37 each has an axial slot 18, similar to slots 18 in FIG. 1, for reception of the keys 19.

In the arrangement of FIG. 3, the various parts, that is body member 35 and plugs 36, are conveniently molded of a synthetic resin material and the plugs 36 clip in to the body member 35. Each plug has an axial finger 41 having a projection 42 which engages in an aperture 43 in the wall of the body member 35. On insertion of a plug the finger 41 is depressed by an inclined forward edge 44 on the projection 42 and then the finger snapping out as the projection is aligned with the aperture 43. For removal of a plug the finger 41 is depressed by pressure on the end at 45. Again, in FIG. 3, a bulkhead is indicated at 46, the connector retained in position by a spring retaining clip 47. However a connector as in FIG. 3 can be used as a straightforward connector and not just as a bulkhead connector. FIG. 4 is an end view of the connector of FIG. 3.

Figure 5:
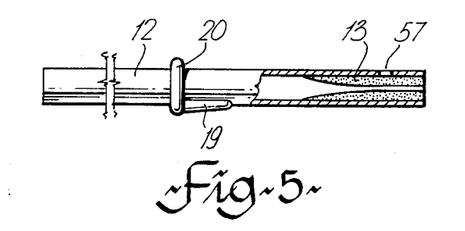
FIGS. 5 and 6 are side and end views respectively of one form of ferrule, FIG. 5 partly in section.
Figure 6:
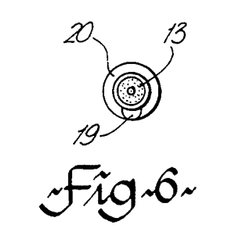

FIGS. 5 and 6 illustrate a ferrule 12, FIG. 5 partly in section to show the cast positioning portion 13. The circumferential rib 20 and key 19 are also shown.

Figure 7:
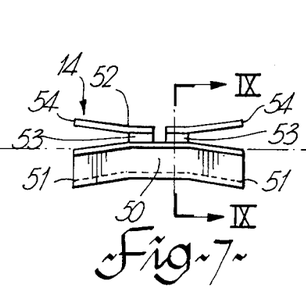
FIGS. 7, 8 and 9 are side, end and cross-sectional views of one form of alignment member, FIG. 9 a cross-section on the line IX—ZIX of FIG. 7.
Figure 8:
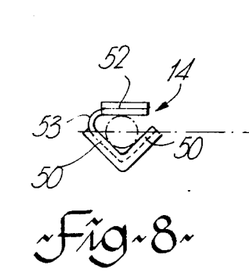
Figure 9:
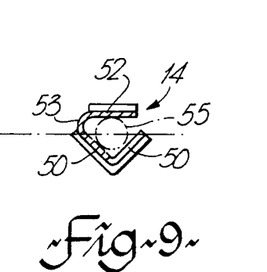

FIGS. 7, 8 and 9 illustrate an alignment member 14. An alignment member is conveniently formed from strip or sheet spring material, for example berrylium copper. In the example illustrated a member has two longitudinal base portions 50 bent into a Vee-shaped form, conveniently being at 90°. The ends of the portions 50 are also bent downwards relative to the axis of the member to form inclined ramps 51. Extending over the interior of the Vee are two spring pressure members 52. These are formed as extension of one of the base portions 50, being attached by narrow neck portions 53 close to the centre of the member. The pressure members 52 cantilever from the centre and are also bent upwards to form inclined ramps 54. The position of the ferrule is indicated by the dotted circle 55.

Figure 10:
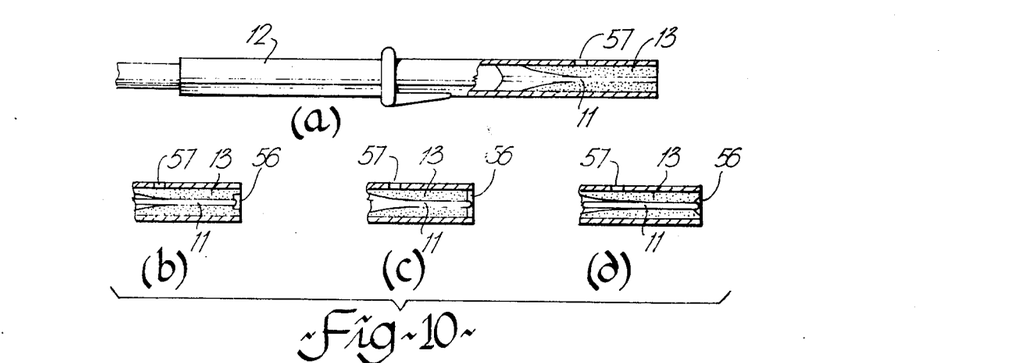
FIG. 10 illustrates alternative shapings of the inner end of the cast material in a ferrule.
Figure 11:
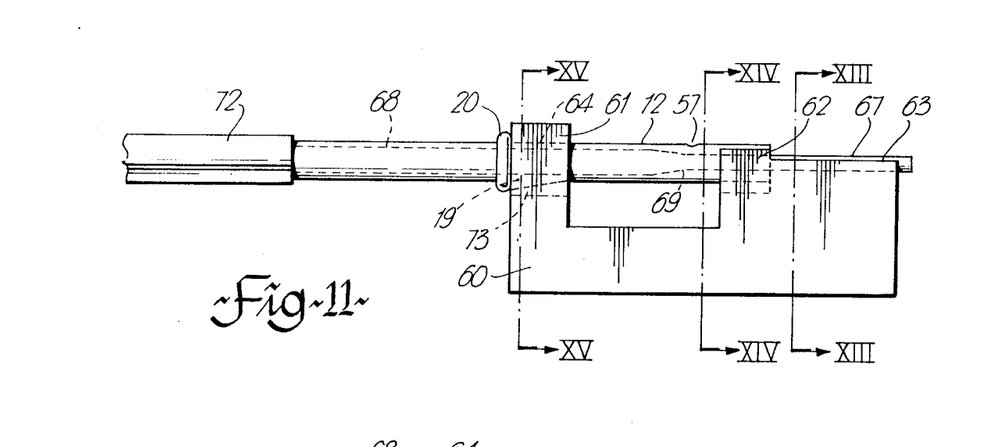
FIGS. 11 and 12 are side and end views of an alignment tool for casting the material in a ferrule.
Figures 12, 13:
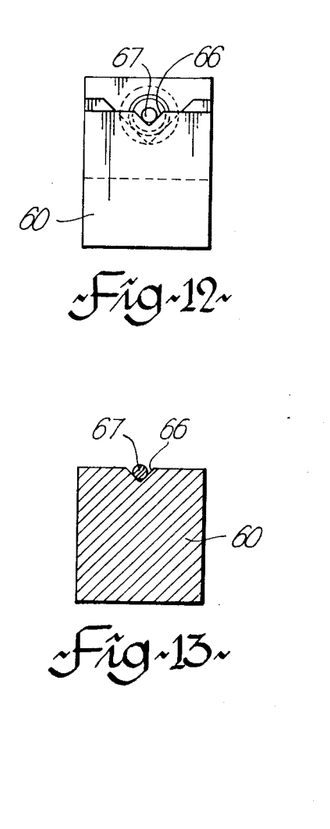
FIGS. 13, 14 and 15 are cross-sections on the lines XIII—XIII, XIV—XIV and XV—XV in FIG. 11 respectively.
Figure 14:
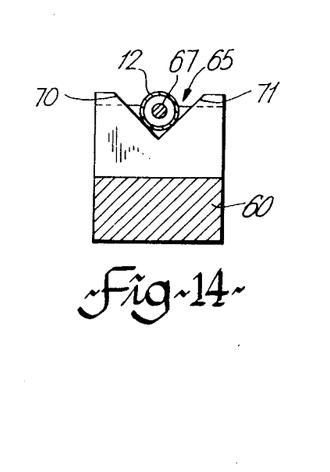
Figure 15:
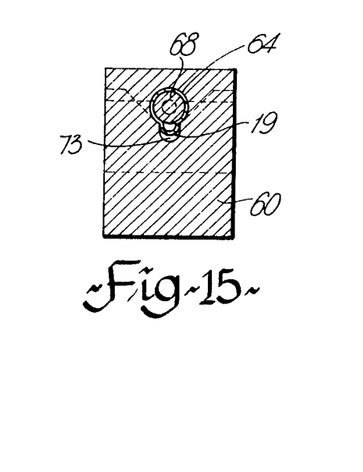

FIG. 10 illustrates four alternative end forms for the inner end of the cast positioning portions 13. In FIG. 10(a) the portion 13 extends right to the end of the ferrule and this is a form as could be used with a dry connector, that is with the fibre ends almost abutting and no index matching fluid between the fibre ends. The fibre ends would be positioned a very small distance in from the ferrule end to avoid damage due to contact between fibre ends.

In FIGS. 10 (b), (c) and (d) the end of the positioning portions are recessed at 56, in different forms, to accommodate an index matching material. This material eliminates any air gap between fibre ends. The fibre ends would be positioned a small distance in to avoid direct contact between ends. Also seen in FIG. 10 is a filler hole 57 in the ferrule through which is injected the material for forming the positioning portion 13.

FIGS. 11 to 15 illustrate a method of forming the cast positioning portions 13 in the ferrules 12. A support and positioning member 60 has two spaced portions 61 and 62 with a further portion 63 extending from portion 62. The member 60 is recessed between portions 61 and 62 and the portion 61 is bored, at 64, to accept a ferrule. Portion 62 is formed with a Vee-shaped groove 65 on its upper surface and the portion 63 is formed with a Vee-shaped groove 66 on its upper surface. The grooves 65 and 66 are positioned such that a ferrule 12 resting in the groove 65 and a mandrel portion 67 resting in the groove 66 are coaxial. The mandrel portion 67 is slightly larger than an uncoated fibre and extends at this diameter for a desired distance into the ferrule. The mandrel then increases towards its outer end to a diameter which is a close fit in the ferrule at 68. The transition between the portion 67 and the portion 68 is slightly bell-shaped, as indicated at 69, to provide an inclined surface on the cast material.

The inclined surfaces 70 and 71 of the groove 65 are datum surfaces and correspond to the surfaces 50 on the alignment member. The groove 66 is accurately aligned and positioned relative to the groove 65 and thus when liquid material, for example a synthetic resin or a low melting point alloy, is injected through the filling hole 57, it is cast around the mandrel to form a bore which is accurately located relative to the datum surfaces 70 and 71, and to the datum positions on the ferrule which are the lines of contact between the ferrule and the surfaces 70 and 71.

To prepare a ferrule it is pushed on to a mandrel with the outer end of the mandrel abutting the large outer end 72 of the mandrel. The ferrule and mandrel are then positioned on the positioning member or tool 60 with the circumferential rib 20 of the ferrule abutting against the portion 61, the ferrule passing through the bore 64 and resting in the Vee-shaped groove 65, the reduced diameter inner end of the mandrel resting in the Vee-shaped groove 66. The portion 61 has a keyway 73 for reception of the key 19 on the ferrule. Thus the reduced diameter portion 67 of the mandrel is accurately positioned in the ferrule, and it should be appreciated that slight variations in the diameter of the ferrule, either the outside diameter and/or inside diameter, and in the concentricity of such diameters will have effectively no effect on the position of the mandrel portion 67 relative to the datum positions on the ferrule, the ferrule also being rotationally located by the key 19.

Once the ferrule and mandrel have been set up in the tool, a casting material is injected into the ferrule through the filling hole 57. A suitable material is a synthetic casting resin, or a low melting point alloy, which can be injected under pressure or under gravity. The shaping of the mandrel at 69 provides a smooth guiding portion into the cast bore after the mandrel is removed. The mandrel can be given a surface treatment before casting to assist in withdrawal after the casting material has set.

While generally it is intended that a bore will be preformed by casting a material round a mandrel, it is also possible that a fibre can be inserted and cast in situ, giving a permanent assembly. In such an arrangement, the fibre will be stripped of its outer coating for a predetermined distance and then inserted in the ferrule. The uncoated end would extend beyond the ferrule and rest in the Vee-shaped groove 66, for correct positioning relative to the datum positions on the ferrule. After casting, the fibre would then be broken off and the end polished.

A connector as in FIGS. 1 and 2 is assembled as follows. Normally the two members 16 and 25 are supplied as a preassembled item, with the sleeve 15 in the body member 16 and an alignment member 14 positioned in the sleeve 15. Following preparation of ferrules, as described above, two fibres are prepared by stripping of the outer coating and then breaking at a predetermined position to give flat, smooth, ends. The fibres are inserted into the prepared ferrules and fastened, as by adhesive. The ends of the fibres will be spaced both from the ferrule ends a very small distance, as explained above.

The fibres are prepositioned in the ferrules prior to fastening, a cap 21 and spring washer 22 being positioned on a fibre before positioning and fastening in a ferrule. The ferrules are then inserted into the alignment member and the caps 21 screwed. The caps 21, with washers 22, hold the ferrules in position, the ferrules in abutting relationship in the alignment member.

Similarly, in the assembly of a connector as in FIGS. 3 and 4, the member 35 alignment member 14 and washer 48 are preassembled as one unit. Also each plug 36 would be preassembled with a prepared ferrule in position, plus a spring 39 and retaining sleeve 40 and supplied as a unit. The fibre would be inserted with the plug and ferrule held in a suitable tool, the fibre having adhesive applied thereto prior to insertion in the ferrule. Alternatively the spring 39 and sleeve 40 can be positioned on the ferrule, prior to insertion and fastening of the fibre, then the ferrule, fibre, spring and sleeve assembled to the plug. The sleeves 40 can be a force fit in the plug or adhesive can be used.

The examples, or embodiments, illustrated in FIGS. 1 to 4 are for joining or connecting a pair of single fibres in end-to-end relationship. The connection can be made, broken, and remade, if necessary for a considerable number of times, without any substantial degradation of the connector efficiency.

The basic broad concept of the present invention can also be used to make a permanent connection between two single fibres—generally referred to as a splice. Thus, considering the arrangement of FIG. 1, with FIGS. 5 to 9, an alignment member 14 can be held in an assembly jig and two ferrules 12 with fibres 10 in position inserted, one from each end. The assembly jig would have locating means for engaging with the keys 19 and then an adhesive applied to permanently retain the ferrules in the alignment member. Alternatively a sleeve could be positioned over the alignment member and extending out at each end, with a centre portion formed to rotationally locate the alignment member and with a local deformation at each end to locate the keys 19. After assembly of ferrules and fibres to the alignment tool, the sleeve is crimped on to the coated portions of the fibres, or on to the outer portions of the ferrules, or by adhesive or other suitable means. Various arrangements can be provided, still using the basic assembly of alignment member and ferrules. In some circumstances, and possibly in the majority of cases, the circumferential rib 20 would not be required for a splice.

Figures 16, 17, 18, 19, 20:
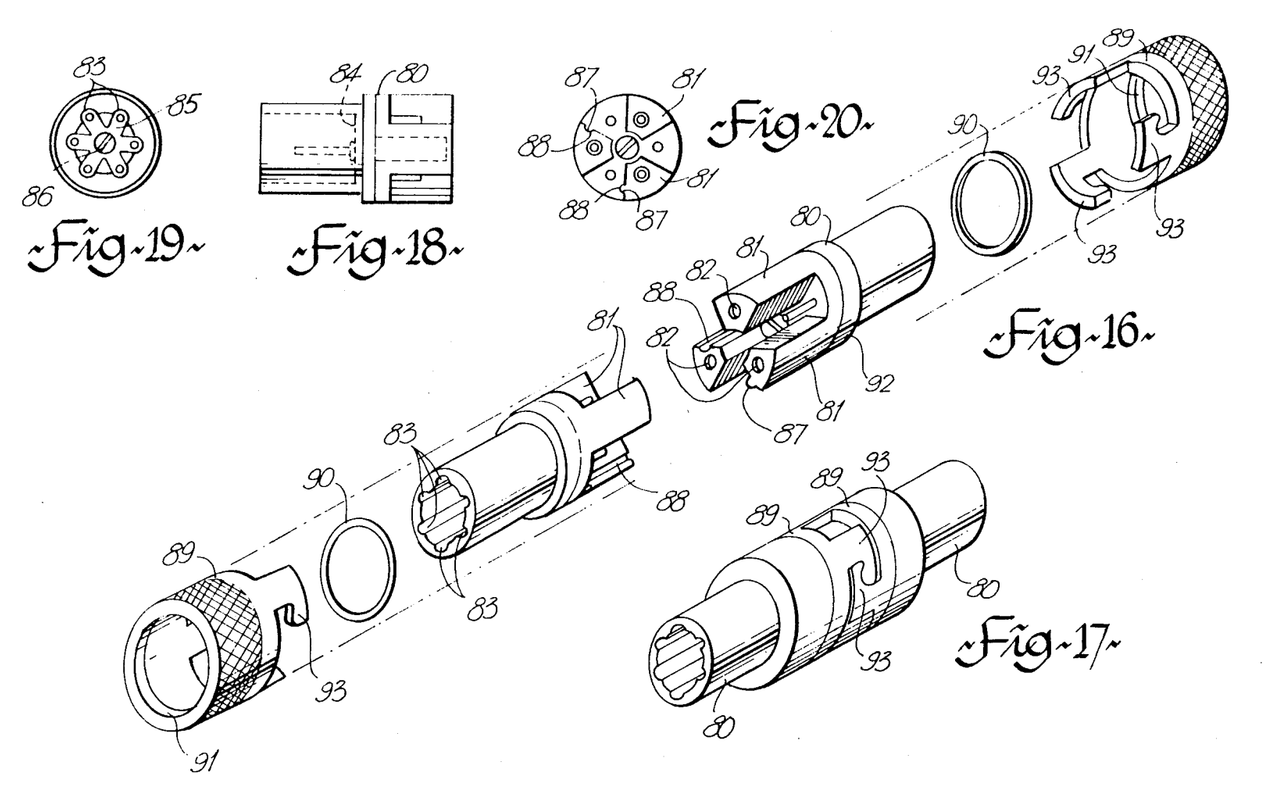
FIG. 16 is an exploded view of one form of connector for connecting a plurality of pairs of single fibres.
FIG. 17 is a perspective view of the connector of FIG. 16, assembled.
FIGS. 18, 19 and 20 are side view and end views respectively of a housing for the connector of FIGS. 16 and 17.

The invention is also applicable to multiple connectors, for connecting a number of pairs of fibres, each pair in independent end-to-end relationship. FIG. 16 is an exploded view of one form of multiple connector, FIG. 17 is a perspective view of an assembled connector as in FIG. 16 and FIGS. 18, 19 and 20 side and end views on each end, respectively, of one member or unit of the connector of FIGS. 16 and 17.

As illustrated in FIG. 16 each connector member or unit comprises a housing 80 having its inner end extended in the form of three fingers 81 of trapezoidal cross-section. The shaping of the fingers 81 is such that the fingers on one housing 80 are a close sliding fit between the fingers 81 on the other housing 80. Each finger 81 has an alignment member in a bore 82, the alignment members being as in FIGS. 7, 8 and 9. The outer ends of the housings 80 are bored to provide approximately semi-circular channels 83. When fibres are inserted into the housings, the ribs 20 on the ferrules slide in the channels 83 until they abut the end surface of the bore, at 84 (FIG. 18). A spring star washer 85, (FIG. 19) is positioned over the ribs 20 and held in place by a screw 86. The alignment members fit in the bores 82 which are shaped to give a predetermined orientation of the alignment members as in FIGS. 1 and 3. The alignment members are located in the correct positional relationship with grooves in end surface 84 which locate the ferrules by the keys 19, as in the examples of FIGS. 1 and 2. To provide a unique rotational relationship between the two housings 80, a rib 87 can be formed along one side surface of a finger in one housing and a groove 88 along a related finger in the other housing. To enable one form of housing to be used for both connector members of units a rib 87 can be formed on one finger and a groove on another, as illustrated in FIG. 16. This enables only one form of housing to be manufactured and used for both housings.

The two housings 80 are assembled by sliding one set of fingers 81 between the other set. An annular connecting member 89 and a washer 90 are applied over each housing 80, and the connecting members brought together. An inwardly projecting rim 91 at the outer end of each connecting member engages, via the washer 90, with a shoulder 92 on each housing. The connecting members are provided at their inner ends with hook-shaped members 93, and the connecting members are pushed together with the hook-shaped members interposed. By rotating one connecting member relative to the other, the hook-shaped members interengage and retain the connecting members and housings assembled. The assembly is then as in FIG. 17, and this is as the housings and connecting members, with alignment members positioned in the housings are generally supplied—as a complete preassembly. After fibres are attached to ferrules, as described above, a ferrule is inserted into each channel 83 and then the star washers 85 fastened to the housings.

Figures 21, 22, 23, 24:
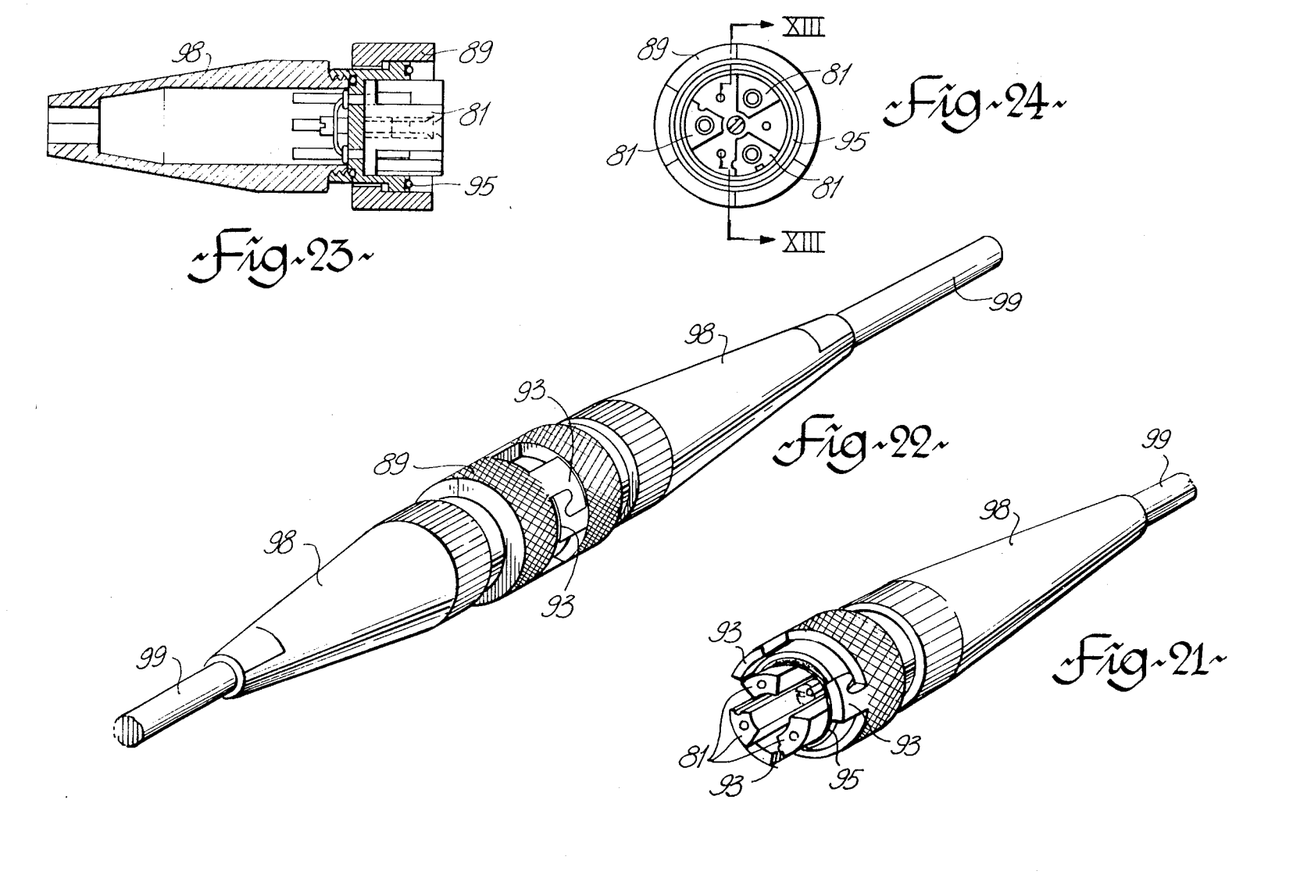
FIG. 21 is a perspective view of one half of an alternative form of connector for a plurality of pairs of single fibres.
FIG. 22 is a perspective view of an assembled connector using two halves as in FIG. 21.
FIGS. 23 and 24 are a longitudinal cross-section and end view respectively of a connector half as in FIG. 21.
Figures 25, 26, 27, 28:
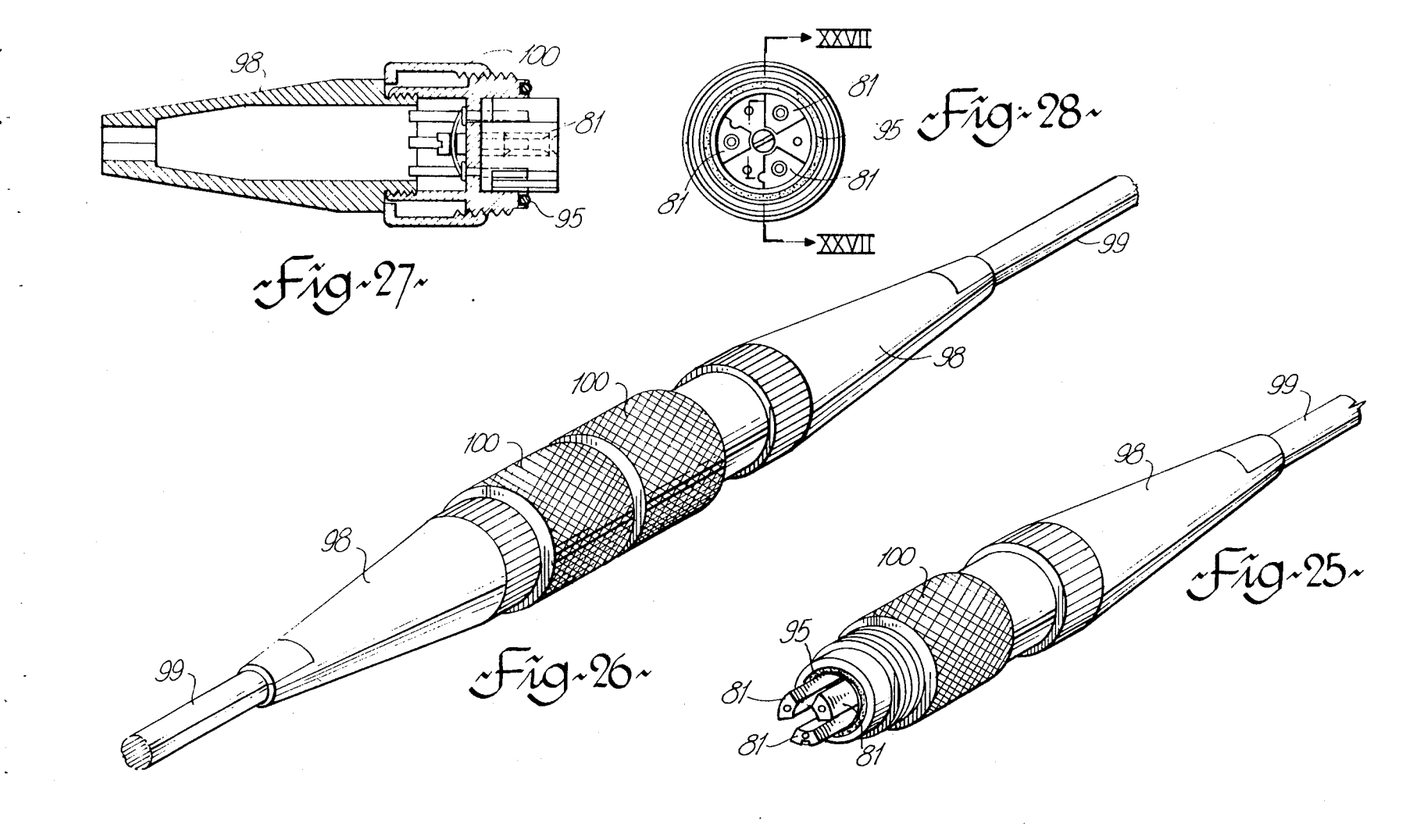
FIG. 25 is a perspective view of one half of a further form of connector for a plurality of pairs of single fibres.
FIG. 26 is a perspective view of an assembled connector using two halves as in FIG. 25.
FIGS. 27 and 28 are a longitudinal cross-section and an end view, respectively, of a connector half as in FIG. 25.

The connector of FIGS. 16 to 20 does not have any sealing between the housings, for prevention of ingress of water. FIGS. 21 to 24 illustrate a modified form of the connector of FIGS. 16 to 20 in which a ring of sealing material 95 is interposed between the opposing faces of the housings 80. Also illustrated in FIG. 21, 22 and 23 is a further modification in which a tapered collar 98 is attached to each housing, the tapered collar clamping on to the exterior surface of a fibre cable, 99, at the ends remote from the housing 80. The collars can act as strain relief members, restrict bending of the fibre cable close to the connector and also seal on the cable outer surface. The connector illustrated in FIGS. 25 to 28 is very similar to that of FIGS. 21 to 24, the difference being that instead of the connecting member 89 with hook-shaped member 93, an internally threaded sleeve 100 is used to engage with an external thread on the connecting member. A single threaded sleeve can be provided, or a sleeve can be positioned on each connecting member, with one of the sleeves engaging with the threads on the other connecting member.

It will be appreciated that the connectors of FIGS. 16 to 20, 21 to 24, and 25 to 28 are hermaphroditic in that only one form of unit or assembly of housing 80, connecting member 89 or sleeve 100, and, where provided, collar 98, is required as both halves of a connector are the same. For this reason it can be more convenient in the connector of FIGS. 25 to 28 for a threaded sleeve 100 to be provided on each housing.

In addition to being applicable to connectors for a plurality of pairs of fibres arranged in a circle as in FIGS. 16 to 28, or even in a plurality of circles if it is desired to connect a fairly large number of fibre pairs, the invention can be used to connect fibres arranged in a straight line. Thus, for example, flat cables, having a number of fibres side-by-side can be connected. Either two such cables can be connected or a cable can be connected to fibre tails on, for example, printed circuit boards and panel boards. Such connections could be used into the transmitting and/or receiving terminals of a communications system and could also be used for bus-bars and other interconnect cables in computer systems and other electronic apparatus.

In a particular example, for connection to a board, referred to as an edge card or edge board connector, short lengths of optical fibre are mounted at the edge of a card or board and the cables are connected to these short lengths. Each pair of fibres will have a ferrule, of similar form to those as in FIGS. 1 to 4. In effect, such a connector would be as if a connector of the form of FIGS. 16 and 17 was to be cut along one side and unwound, to be in a straight line. The form of the housings could vary depending on requirements, but there would be an alignment member and two ferrules for each connected pair of fibres. In connecting a cable with the fibres arranged in one or more circles to a card or board, a short transitional length of fibre cable can be provided, with a round connector element on one end and a linear element on the other end.

Thus, as will be seen, the fibre ends are fully protected once they are secured in the ferrules and insertion of the ferrules into the alignment member avoids any possible damage to the fibre ends. The connector can readily be cleaned as, by removing the ferrules from the alignment member, a clean passage through the connector is obtained for easy cleaning. At the same time build up of tolerances is avoided by relating the fibre receiving bore to datum positions on the ferrule, which positions in turn relate to datum surfaces in the alignment member and on the tool. The alignment member, while illustrated as being in a single piece, such as by being formed from strip or sheet material, can be formed in other ways and could also conceivably be molded in a plastic material. The essential feature is the provision of the datum surfaces which are reproduced in the alignment tool. The ferrules are, for example, of stainless steel tube, but could be of other forms, and again could be molded. The material of the ferrules would need to be compatible with the material cast in the ferrule to form the fibre receiving bore, and also with the alignment member.

The invention is applicable to various forms of fibre, including those having a fused quartz or silica core and cladding and a plastic protective coating, those having a fused core and a plastic cladding and those using lower melting point glasses such as borosilicates and those having plastic core and cladding.

In all the arrangements, an index material, such as an index matching fluid, can be inserted between the opposed ends of a fibre pair on assembly.

What is claimed is:

1. An optical fiber connector for connecting ends of at least one pair of single optical fibers in end-to-end alignment, comprising:
    two tubular ferrules, a ferrule for each fiber end, each ferrule including datum positions extending along the ferrule and spaced apart around the periphery, and further including material in the ferrule defining a fiber receiving bore, said bore a close fit on a fiber end and having a predetermined positional relationship relative to said datum positions;
    locating means on each ferrule, said locating means having a predetermined positional relationship with said datum positions;

an elongate alignment member having a center section of constant cross-section normal to the length of the member and inclined end sections, the end sections including opposed, spaced, datum surfaces for engagement with said datum positions on said ferrules;

means for engaging with said locating means on each ferrule to rotationally locate said ferrules relative to said alignment member and to rotationally align said locating means; and means for urging said ferrules into said center section of said alignment member, in end-to-end relationship, with said datum positions in contact with said datum surfaces.

2. A connector as claimed in claim 1, including means permanently retaining said ferrules in said alignment member.

3. A connector as claimed in claim 2 in which an optical fiber adheres within said fiber receiving bore of each ferrule with the ferrule inner end extending beyond an end of the fiber.

4. A connector as claimed in claim 1, said locating means on said ferrules comprising a radially extending locating member.

5. A connector as claimed in claim 1, including an elongate housing, means in said housing for rotationally locating said alignment member, said housing including said means for engaging with said locating means on said ferrules.

6. A connector as claimed in claim 5, said ferrules each including a circumferentially extending rib intermediate the ends of the ferrule, said rib axially locating said ferrule in said housing.

7. A connector as claimed in claim 5, for connecting ends of a plurality of pairs of single optical fibres in end-to-end relationship including a plurality of alignment members in said housing, each alignment member rotationally located and means for retaining a pair of ferrules in end-to-end relationship in each alignment member.

8. A connector as claimed in claim 5, said means for engaging with said locating means on said ferrules comprising a pair of keyways in said housing, each keyway engageable by a key projecting from the outer space of a respective ferrule.

9. A connector as claimed in claim 5, and further comprising a support plate, said housing being locatable within an aperture through the plate so that a flange projecting from the housing abuts the plate, the housing having fixture means adjustable to pin the plate against the flange.

10. A connector as claimed in claim 5, including means releasably retaining said ferrules in said alignment member.

11. A connector as claimed in claim 1, and further comprising means for urging ends of said ferrules into abutment.

12. A connector as claimed in claim 1, in which the ferrules each have a cylindrical outer surface.

13. A connector as claimed in claim 1, in which said alignment member comprises an angle sectioned member providing two datum surfaces against which said ferrules locate in line contact.

14. A connector as claimed in claim 13, in which said means for urging said ferrules into said center section comprises a pair of spring plates cantilever mounted from said angled member and longitudinally spaced from one another so that, on assembly the spring plates act on respective ferrules.

15. A connector as claimed in claim 14, in which the angled member and said spring plates are angled outwardly at their ends to form ramps.

16. A connector as claimed in claim 15, including an elongate housing, means in said housing for rotationally locating said alignment member, further comprising a locking sleeve within the housing, said sleeve having a bore conforming in shape to the angled member, and spring plates to locate the member and the plates against rotation within the housing.

17. A connector as claimed in claim 1, in which moulded material within said ferrule defines said fiber receiving bore.

18. A connector as claimed in claim 17, in which the moulded material extends to the inner end of the ferrule.

19. A connector as claimed in claim 18, in which a recess is formed in the moulded material at the inner end.

20. A connector as claimed in claim 17, in which the ferrule extends beyond the moulded material at the inner end.

21. A two-part hermaphroditic connector incorporating a plurality of connectors as claimed in claim 1 in which terminated optical fibers project as pins from one part and are engageable in sockets in the other part to provide connection to terminated optical fibers mounted in the sockets, said parts each having a plurality of first guide means to determine the orientations of respective optical fibers and said sockets each housing a said second guide means providing said datum surfaces and a first clamp means to fix the positions of the ferrules on assembly.

22. A two-part connector as claimed in claim 21, further comprising interengaging screw means on the two parts for clamping the parts together.

23. A two-part connector as claimed in claim 21, further comprising interengaging bayonet fixture means on the two parts for clamping the two parts together.

24. A two-part connector as claimed in claim 21, whereby fingers extend from each part and define recesses therebetween and in which the sockets are housed in the fingers and the pins project into the recesses intermediate adjacent fingers.

25. A two part connector as claimed in claim 24, including a longitudinal groove in at least one of said fingers of one part and a longitudinal rib on at least one of said fingers of said other part, said groove and rib cooperative to provide a predetermined rotational alignment between said parts.

26. A two part connector as claimed in claim 25, said connector being hermaphroditic, at least one finger of each part having a longitudinal groove and at least one finger of each part having a cooperating longitudinal rib.

27. A two part connector as claimed in claim 26, wherein the fingers and the recesses are of similar trapezoidal sectional shape.

28. A two part connector as claimed in claim 25, wherein the sockets and/or pins on each of said parts of said connector are arranged on a circular locus.

29. A two part connector as claimed in claim 21, in which the sockets and/or pins on the respective parts of said connector are arranged on a linear locus.

30. A method of terminating a dielectric optical waveguide to adapt the waveguide for use in an optical connector comprising:

locating a ferrule relative to a first guide means to define a predetermined ferrule orientation;

locating said ferrule relative to a second guide means having contact surfaces adapted to function as datum surfaces;

disposing a mandrel within the ferrule so that a free end thereof projects beyond an end of the ferrule;

locating said free end relative to third guide means to position the mandrel within the ferrule;

moulding material around the mandrel to fix said position;

withdrawing the mandrel and substituting the dielectric optical waveguide in a passage formed thereby;

said first, second and third guide means being fixed relative to one another so as to determine the position of said passage relative to said datum surfaces and said predetermined orientation.

31. A method as claimed in claim 30, in which the ferrule and the free end of the mandrel are cylindrical and the second and third guide means present angled surfaces for engagement therein of the ferrule and the mandrel respectively.

32. A method as claimed in claim 31, in which the first guide means is provided by a key on the ferrule which is engageable in a keyway on a jig incorporating said guide means.

33. A method as claimed in claim 31, in which the dielectric optical waveguide is stripped of any plastic coating before being terminated.

34. A method as claimed in claim 30, in which the dielectric optical waveguide is retained in the passage by means of an adhesive.

35. A method of terminating a dielectric optical waveguide to adapt the waveguide for use in an optical connector, comprising:

locating a ferrule relative to a first guide means to define a predetermined rotational orientation of the ferrule;

locating said ferrule relative to a second guide means having contact surfaces adapted to function as datum surfaces;

disposing a dielectric optical waveguide within the ferrule so that a free end thereof projects beyond an end of the ferrule;

locating said free end relative to a third guide means to position the dielectric waveguide within the ferrule relative to said datum surfaces;

moulding material around the dielectric optical waveguide to fix said position;

said first and second guide means being fixed relative to one another so as to determine the rotational relationship between said datum surfaces and said ferrules.

36. A method of connecting ends of a pair of single optical fibers in end-to-end axis alignment, comprising;

locating a ferrule in an alignment tool, datum positions on said ferrule in contact with datum surfaces on said tool;

positioning a mandrel in said ferrule in a predetermined positional relationship with said datum surfaces;

casting material around said mandrel to form a fiber receiving bore;

removing the mandrel and inserting a fiber in the bore; and locating two of the ferrules in an alignment member in end-to-end relationship, said alignment member including datum surfaces corresponding to said datum surfaces on said alignment tool, the datum positions on said ferrules in contact with said datum surfaces on said alignment member.

* * * * *